United States Patent Office 3,576,003
Patented Apr. 20, 1971

3,576,003
ARYL HETERO ACRYLAMIDES
Albert F. Strobel, Delmar, and Sigmund C. Catino, Castleton, N.Y., assignors to GAF Corporation, New York, N.Y.
No Drawing. Continuation-in-part of applications Ser. No. 248,305, Dec. 31, 1962, and Ser. No. 573,795, Aug. 22, 1966. This application Nov. 15, 1967, Ser. No. 683,136
Int. Cl. C07d 5/16, 63/12; C11d 7/00
U.S. Cl. 260—332.2      19 Claims

ABSTRACT OF THE DISCLOSURE

Substantially colorless compounds which exhibit a prominent absorption peak between 250 A. and 400 A. and which are stabilizers for organic materials against the degradative effect of such radiation are characterized as aryl, hetero acrylamides, the said hetero moiety being of the group containing 5 and 6 members in the ring and wherein the hetero atom is at least one of the group of oxygen, nitrogen, and sulfur.

---

This application is a continuation-in-part of application Ser. No. 248,305, filed Dec. 31, 1962, and application Ser. No. 573,795, dated Aug. 22, 1966, now both abandoned.

This invention relates to new and useful compounds which impart to organic materials superior resistance to degradation and deterioration when they are exposed to actinic radiation, and in particular, to ultra-violet radiation. This invention further relates to processes for the preparation of new and useful compounds of the type hereinbefore described. The compounds with which this invention is concerned are characterized as aryl hetero acrylamides.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as tre ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles, will fade on exposure to sunlight, and, in particular, to ultra-violet light. Many plastics, in addition to developing color formation and reduction in transparency, become brittle, lose their elasticity, crack and eventually completely deteriorate on exposure to sunlight. Paints, varnishes, lacquers and the like, also are prone to these effects even though here the transparency property may not be paramount.

We have discovered that by combining aryl hetero acrylamides with organic materials, there results compatible combinations with a vast number of film-forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visible region of the electro magnetic field, neverthless are essentially colorless compounds and can be employed with the assurance that they will not contribute to color in normally colorless formulations, nor will they affect the color of a colored formulation such as a paint film, or a dyed textile. Many of the compounds of this invention also absorb some visible light on the violet end of the spectrum, which renders them particularly useful in many formulations which are susceptible to visible light degradation. Thus, polyesters and polyethylene are known to be so characterized, and the stabilization of these materials is extremely successful when using the compounds herein contemplated.

The compounds of this invention, additionally are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is, therefore, an object of the present invention to provide new and useful compounds characterized by outstanding ultra-violet absorbing properties.

It is still another object of this invention to provide new and useful aryl hetero acrylamides which are outstanding ultra-violet absorbing compounds.

It is still a further object of the present invention to provide processes for the preparation of new and useful ultra-violet absorbing compounds which are characterized as aryl hetero acrylamides.

Other objects will appear hereinafter as the description proceeds.

The aryl hetero acrylamides which are contemplated in this invention exhibit a prominent absorption peak or peaks between 250 A. and 400 A. and are devoid of nitro groups and nuclear bonded amino groups and have the following general formula:

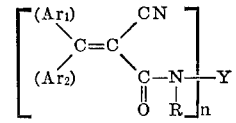

wherein $Ar_1$ represents a heterocryclic nucleus of 5 and 6 membered rings and wherein the hetero atoms are selected from the group consisting of oxygen, nitrogen and sulfur and the fused benzoheterocycles of the said 5 and 6 membered rings, said hetero rings containing at least one pair of conjugated double bonds and $Ar_2$ represents an aromatic carbocyclic nucleus and $n$ is an interger from 1 to 2, and when $n$ is 1, R and Y may be independently selected from the group consisting of hydrogen, alkyl, substituted alkyl, aryl, substituted aryl or R and Y may together form the atoms necessary to complete a 5 or 6 membered heterocyclic ring with the amido nitrogen atom, and when $n$ is 2 R is similar as when $n$ is 1 and Y is a bivalent bridging radical such as alkylene, arylene, or bivalent hetero similar to $Ar_1$.

Examples of suitable heterocycles are:

| | |
|---|---|
| thiophene | imidazole |
| furane | 2-isoimidazole |
| pyrrole | 1,2,3-triazole |
| α-pyran | 1,2,4-triazole |
| α-pyrone | tetrazole |
| pyridine | 1,3,4-oxadiazole |
| 1,2-dehydropyridine | 1,2,5-oxadiazole |
| oxazole | 1,2,3-thiadiazole |
| thiazole | 1,2,3-oxathiazole |
| isoxazole | pyridazine |
| isothiazole | pyrimidine |
| pyrazole | pyrazine |
| 3-isopyrazole | 1,3,5-triazine | and fused ring systems of benzene nuclei and naphthalene nuclea with the aforementioned heterocyclics, e.g.,

| | |
|---|---|
| benzothiophene | benzimidazole |
| benzofurane | 1,2,3-benztriazole |
| cinnoline | benzoxazole |
| phthalazine | |

The hetero nuclei may contain alkyl, substituted alkyl, halogen, acyl, sulfonyl, carboxamido, oxy and similar inert substituents which may vary the ultra-violet absorption spectrum but which do not affect the function and stability of the compounds. Such substituents include:

alkyl
    methyl
    ethyl
    n-propyl
    iso-propyl
    n-butyl
    iso-butyl
    tertiary-butyl
    secondary-butyl
    n-amyl
    iso-amyl
    tertiary-amyl and the other isometiric amyls
    n-hexyl
    iso-hexyl and the other hexyls
    n-heptyl
    iso-heptyl and the other isomeric heptyls
    n-primary nonyl (nonyl-1)
    nonyl-(2)
    nonyl-(3)
    nonyl-(5)
    2-methyl-octyl-2
    4-ethyl-heptyl-4
    2-methyl-4-ethyl-hexyl-4
    n-primary octyl
    octyl-(2) (capryl)
    2-methyl-3-ethyl-pentyl-3
    2,2,4-trimethyl-pentyl-4
    2-ethyl-hexyl-1
    3-ethyl-hexyl-3
    2-methyl-heptyl-2
    3-methyl-heptyl-3
    4-methyl-heptyl-4
    n-primary decyl (decyl-1)
    decyl-4 (secondary decyl)
    2-ethyl-octyl-3 (tertiary decyl)
    4-propyl-heptyl-4 (tertiary decyl)
    undecyl-1 (n-primary decyl)
    undecyl-2 (n-secondary decyl)
    dodecyl-1 (n-dodecyl)
    tridecyl-1 (n-tridecyl)
    tridecyl-7
    3-ethyl-undecyl
    tetradecyl-1 (n-tetradecyl)
    pentadecyl-1 (n-pentadecyl)
    pentadecyl-8
    hexadecyl (cotyl)
    heptadecyl-9
    octadecyl-1
    2-methyl heptadecyl-2
    eisocyl-1
    docosyl-1
    tricosyl-12
    tetracosyl
    tricapryl
    pentacosyl
    hexacosyl
    heptacosyl
    octacosyl
    nonacosyl
    myrisyl (30 carbons)
alkenyl
    allyl ($CH_2=CHCH_2-$)
    methallyl ($CH_2=C(CH_3)CH_2-$)
    crotyl ($CH_3CH=CHCH_2-$)
    butenyl-1 ($CH_2=CH-CH_2-CH_3$)
    pentenyl-1
    α-isopropyl allyl
    β-ethyl-3-propyl allyl
    2-methyl-octenyl-6
    decenyl-1
    decenyl-2
    undecenyl
    dodecenyl-2
    hetadecenyl
    docosenyl
    pentamethyl eicosenyl
substituted alkyl
    cyanoethyl
    cyano-n-propyl
    cyano-isopropyl
    cyano-n-butyl
    cyano-isobutyl
    cyano-n-amyl
    cyano-isoamyl
    cyanohexyl
    cyanoheptyl
    cyano-n-octyl
    cyano-nonyl
    cyanodecyl
    cyanolauryl
    cyanostearyl and the like
    hydroxyethyl
    hydroxy-n-propyl
    hydroxy-isopropyl
    hydroxy-n-butyl
    hydroxy-isobutyl
    hydroxy-n-amyl
    hydroxy-isoamyl
    hydroxy-hexyl
    hydroxy-heptyl
    hydroxy-nonyl
    hydroxy-decyl
    hydroxy-lauryl
    hydroxy-stearyl and the like
    carbomethoxyethyl
    carbomethoxybutyl
    carbomethoxyamyl
    carbomethoxyhexyl
    carbethoxypropyl
    carbethoxybutyl, etc.
    carbopropoxyethyl
    carbopropoxypropyl
    carbopropoxybutyl, etc.
    carbobutoxyethyl
    carbobutoxybutyl, etc.

chloroethyl
chloropropyl (N-propyl, isopropyl)
chlorobutyl (N-butyl, isobutyl, etc.)
chloroamyl
chlorohexyl
chlorodecyl
chlorolauryl, and the like
bromoethyl
bromopropyl (N-propyl, isopropyl)
bromobutyl (N-butyl, isobutyl, etc.)
bromoamyl
bromohexyl
bromodecyl
bromolauryl, and the like
methoxyethyl
methoxypropyl (N-propyl, isopropyl)
methoxybutyl (N-butyl, isobutyl, etc.)
methoxyamyl
methoxyhexyl
methoxydecyl
methoxylauryl, and the like
ethoxyethyl
ethoxypropyl (N-propyl, isopropyl)
ethoxybutyl (N-butyl, isobutyl, etc.)
ethoxyamyl
ethoxyhexyl
ethoxydecyl
ethoxylauryl, and the like
hydroxyethoxyethyl
hydroxyethoxypropyl
hydroxyethoxybutyl
hydroxyethoxyamyl
hydroxypropoxyethyl
hydroxypropoxypropyl
hydroxypropoxybutyl
hydroxypropoxyamyl
hydroxybutoxyethyl
hydroxybutoxypropyl
hydroxybutoxybutyl
hydroxybutoxyamyl halogen
    fluorine
    chlorine
    bromine
    iodine acyl
    acetyl
    propionyl
    butanoyl
    amoyl, etc.
    benzoyl
    toluoyl
    naphthoyl, etc.

sulfonyl
    $CH_3SO_2$
    benzene sulfonyl
    toluene sulfonyl, etc.

oxy
    hydroxy
    methoxy
    ethoxy
    hydroxyethoxy, etc.

carboxamido($—CONH_2$) and substituted forms, e.g.
    N-methyl carboxamido ($CONHCH_3$)
    N-methyl carboxamido
    N,N-dimethyl carboxamido
    N-diethyl carboxamido, etc.
    N-ethyl carboxamido R and Y (when $n=1$) may be any of the aforementioned alkyl, alkenyl, hetero and substituted forms thereof and additionally may be aryl, and substituted forms thereof such as phenyl
tolyl
xylyl
cumyl
$\alpha$-naphthyl
$\beta$-naphthyl
$\alpha$-anthraquionyl
$\beta$-anthraquinonyl
$\gamma$-anthraquinonyl
phenanthranyl
diphenyl and the alkyl substituted derivatives thereof substituted aryls, e.g.
    anisole
    phenetole
    p-diethoxyphenyl
    1-methoxy phenanthryl
    $\alpha$-naphthylmethylether
    $\beta$-naphthylmethylether
    $\alpha$-naphthylethylether
    $\beta$-naphthylethylether
    hydroxyethyl phenyl
    hydroxypropyl phenyl
    chlorophenyl
    bromophenyl
    1,2-dichlorophenyl
    1,3-dichlorophenyl
    1,3,5-trichlorophenyl
    1,2-dibromophenyl
    $\alpha$-chlorotolyl
    m-chlorotolyl
    m-bromotolyl
    bromo-o-xylyl
    $\alpha,\beta$-dichloronaphthyl
    4-bromoacenaphthyl
    carboxyphenyl
    carboxytolyls
    carboxyxylyls
    carboalkoxylphenyls, e.g.
        carbomethoxyphenyl
        carboethoxylphenyl
    carbalkoxytolyls, e.g. carbomethoxytolyls
    acetophenyl
    propiophenyl
    butyrophenyl
    lauroylphenyl
    stearoylphenyl
    p-acetotolyl
    $\alpha$-acetotolyl
    $\alpha$-benzoyl naphthyl
    $\beta$-benzoyl naphthyl
    acetaminophenyl
    acet-methylamino phenyl
    o-acetoaminotolyl
    p-acetoaminotolyl
    $\alpha$-acetoaminonaphthyl
    $\beta$-acetoaminonaphthyl
    propio-aminophenyl
    butyro-aminophenyl
    o-propio-aminotolyl
    p-propio-aminotolyl
    o-butyroaminotolyl
    p-butyroaminotolyl
    o-lauroylaminotolyl
    p-lauroylaminotolyl
    o-stearoylaminotolyl
    sulfamyl phenyl
    sulfamyl naphthyl It will be noted that the R and Y substituents encompass the above-described generic class of groupings which include alkyl, cyanoalkyl, alkenyl, carbalkoxyalkyl, haloalkyl, alkoxyalkyl, hydroxy alkoxyalkyl, halogen, acyl, sulfamyl, carboxyamidophenyl, alkylphenyl, alkoxyphenyl, hydroxyalkylphenyl, halophenyl, carboxyphenyl, carbalkoxyphenyl, acylphenyl, sulfamylphenyl and acylaminophenyl.

$Ar_2$ may be any aryl or substituted aryl moiety described above as suitable R groups and, preferably, $Ar_2$ is monocyclic or bicyclic, i.e. benzene ring or naphthalene ring and preferably Ar₂ is a benzene ring.

Suitable bivalent bridging radicals for Y as illustrative of the alkylene, arylene, cycloalkylene and bivalent hetero groupings when $n=2$ include:

1. —CH₂CO₂—
—CH₂CH₂CH₂—
—CH₂CH₂CH₂CH₂—
—CH₂CH₂CH₂CH₂CH₂—
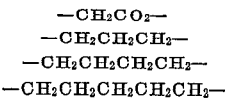

2. 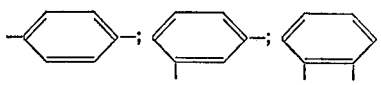

3. 

4. 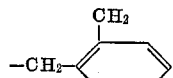

5. 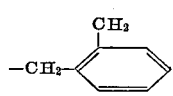

6. 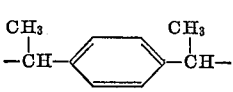

7. 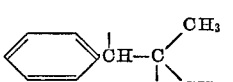

8. 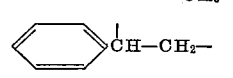

9. 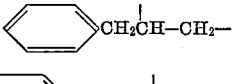

10. 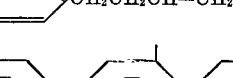

11. 

12. 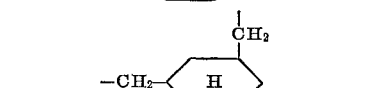

13. 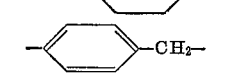

14. 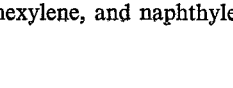

The preferred bridging groups are $C_2$ to $C_{10}$ alkylene, phenylene, cyclohexylene, and naphthylene.

It is of course clear that other non-chromophoric substitutents may be present in the above radicals, e.g., —CHClCHCl—
—CHBrCH₂CCHBr—
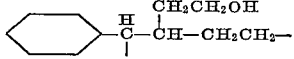

and the like.

The general procedure for preparing the compounds of this invention involves a condensation of an aryl hetero ketone with a selected cyanomethylene acetamide or substituted acetamide, preferably in the presence of an acidic catalyst.

Suitable ketones include:

2-acetamido-4-phenyl-5-thiazolyl phenyl ketone
2-benzofuryl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl 2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
4,5-dimethyl-2-thiazolyl phenyl ketone
2,5-dimethyl-3-thienyl phenyl ketone
2,5-dimethyl-3-thienyl p-tolyl ketone
2,5-dimethyl-3-thienyl p-ethylphenyl ketone
2,3-dimethyl-1-naphthyl 2-thienyl ketone
2,5-diphenyl-3-furyl phenyl ketone
4,5-diphenyl-3-isoxazolyl phenyl ketone
1,5-diphenyl-3-pyrryl phenyl ketone
2-furyl-o-tolyl ketone
2-furyl-p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl 2-thienyl ketone
2-methyl-5-benzoaxazolyl phenyl ketone
5-methyl-2-thiazolyl phenyl ketone
5-methyl-3-phenyl-4-isoxazolyl phenyl ketone
5-methyl-1-phenyl-1,2,3-triazol-4-yl phenyl ketone
2-methyl-3-pyridyl phenyl ketone
1-naphthyl 2-pyridyl ketone
1-naphthyl 4-pyridyl ketone
1-naphthyl 3-pyridyl ketone
2-naphthyl 3-pyridyl ketone
phenyl 5-phenyl-3-furyl ketone
phenyl 5-phenyl-3-isoxazolyl ketone
phenyl 5-phenyl-3-pyrryl ketone
phenyl 5-phenyl-2-pyrryl ketone
phenyl 5-phenyl-2-thienyl ketone
phenyl 4-thiazolyl ketone
phenyl 5-thiazolyl ketone
phenyl 2-thienyl ketone
phenyl 3-pyrazolyl ketone
phenyl 2-pyridyl ketone
phenyl 4-pyridyl ketone
phenyl 1,2,5-triphenyl-3-pyrryl ketone
phenyl 1-phenyl-4-pyrazolyl ketone
phenyl 6-phenyl-3-pyridyl ketone
phenyl 2-furyl ketone
p-methoxyphenyl 2-thienyl ketone
2-furyl m-methoxyphenyl ketone
p-hydroxyphenyl 5-methyl-2-thienyl ketone
2,5-dichloro-3-thienyl phenyl ketone
2,6-dimethyl-4-pyridyl phenyl ketone
3,allyl-4-hydroxyphenyl 5-ethyl-2-thienyl ketone 3,5-dichloro-2-hydroxyphenyl 2-furyl ketone
3,5-dichloro-4-methoxy-2-pyridyl phenyl ketone
3,5-dichloro-2-pyridyl phenyl ketone
3,5-dimethyl-4-isoxazolyl phenyl ketone
2,4-dimethyl-5-oxazolyl phenyl ketone
p-ethylphenyl 5-ethyl-2-thienyl ketone
4-tertiarybutyl-3-chloro-2-hydroxyphenyl 2-furyl ketone
5-ethyl-2-thienyl p-methoxyphenyl ketone
6-allyloxy-2,4-xylyl 2-furyl ketone
3'-chloro-4'-methoxy-4-biphenyl-yl 2-thienyl ketone
o-chlorophenyl 5-chloro-2-thienyl ketone In addition to the above contemplated derivatives, polyoxyalkylated derivatives thereof are within the purview of this invention. Any of the aforementioned compounds containing at least one reactive hydrogen atom may be reacted with an alkylene oxde or a compound functioning as an oxide (or mixtures thereof) such as ethylene oxide
propylene oxide
butylene oxide
isobutylene oxide
glycidol
epichlorohydrin
butadiene dioxide
isobutylene oxide
styrene oxide and the like to yield the corresponding polyoxyalkylated products. Among the types of compounds which are reactive in this manner are:

hydroxy compounds
amide compounds
carboxy compounds, etc.

From one to about 200 moles of oxyalkylating agent may be condensed with the said reactive compounds.

The following examples will serve to illustrate the present invention without being deemed limitative thereof. Parts are by weight unless otherwise indicated.

EXAMPLE 1

Preparation of α-cyano-β-phenyl-β(2-thienyl) acrylamide

Into a 500 ml. three-necked flask fitted with a stirrer, thermometer, Barrett-type water separator (which allows the upper layer to be returned to the reaction flask), reflux condenser and heating mantle, are added 47.28 grams of phenyl - 2 - thienyl ketone (M.W.=189, =0.25 mole), 21.0 grams of cyanoacetamide (M.W.=84, =0.25 mole), 4.0 grams of ammonium, acetate, 24 mls. of glacial acetic acid and 50 mls. benzene. The reaction mixture is then heated to vigorous reflux and stirred for 55 hours at 98°–100° C. During this period, 1.0 gram additions of ammonium acetate are made after 7 hours, 25 hours and 30 hours. The benzene is then steam distilled from the reaction mixture. The residue after steam distillation is filtered at 35° C. The solid material is washed on the funnel with 200 mls. of water and then ground in a mortar to break up lumps. This material is then heated to 75° C. with 250 mls. isopropanol cooled to 5° C., filtered and washed on the funnel with 100 mls. isopropanol at 5° C. After drying in air at 80° C., there is obtained 44.4 grams of α-cyano-β-phenyl-β-(2-thienyl) acrylamide which melts at 195.3° C.–197° C.

EXAMPLE 2

Example 1 is repeated except that the ketone employed in the preparation of the acrylamide is 5-bromo-2-thienyl phenyl ketone.

EXAMPLE 3

Example 2 is repeated, employing the following ketones:

(a) 3,4-dimethoxyphenyl 2-furyl ketone
(b) 2,6-dimethyl-3-pyridyl phenyl ketone
(c) 4,5-dimethyl-3-pyrryl phenyl ketone
(d) 2,5-dimethyl-3-thienyl phenyl ketone
(e) 2-furyl o-tolyl ketone
(f) 2-methyl-1-naphthyl 2-thienyl ketone
(g) 1-naphthyl 2-pyridyl ketone
(h) phenyl 3-pyrazolyl ketone
(i) p-hydroxyphenyl 5-methyl-2-thienyl ketone

EXAMPLE 4

The product of Example 1 is used in a nitrocellulose lacquer as follows:

A mixture of 20 parts of solution 1 and 80 parts of solution II is prepared wherein solution I consists of:

| | Parts |
|---|---|
| ½ sec. nitrocellulose | 46 |
| Product of Example 1 | 4 |
| Cellolyn 502 (non-drying plasticizing alkyd resin of Hercules Powder Co.) | 35 |
| Dibutyl phthalate | 50 | and solution II consists of:

| | Parts |
|---|---|
| Butyl acetate | 35 |
| Butanol | 15 |
| Toluene | 50 |

The resulting lacquer solution is drawn out on a metal plate with a Bird film applicator to give a 3-mil film. A similar film is prepared without the product of Example 1. Upon exposure to ultraviolet light, the latter film yellows and deteriorates before any visible signs of yellowing are observed in the protected film.

EXAMPLE 5

Example 2 is repeated employing as the ketone, p-(2-ethylhexyloxy)-phenyl 2-thienyl ketone.

EXAMPLE 6

The product of Example 5 is incorporated into polyethylene by melting at 125° C. a mixture of 99.7 g. of polyethylene wax p.t. 95504 (Semet-Solvay) and 0.3 g. of absorber. The material is then pressed out in a Carver press to give a film of about 0.03 in. thick. The polyethylene film is well stabilized to ultraviolet light and admirably protects food packaged therein.

EXAMPLE 7

The product of Example 3(c) is incorporated into a synthetic latex as follows:

A 50% dispersion of the absorber of Example 3(c) is made by kneading 20 g. of the compound with 20 g. of formaldehyde-naphthalene - 2 - sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed on to leather. The film prepared in this manner shows less tendency to yellow on exposure to light than a similar film prepared in the same manner, but omitting the ultraviolet absorber.

EXAMPLE 8

The product of Example 3(d) is prepared as a 3% solution in methyl Cellosolve and a sponge of polyvinyl chloride foam is impregnated therewith. The foam is prepared from the following formulation:

| | Pts. |
|---|---|
| Marvinol VR–10 (polyvinyl chloride resin U.S. Rubber) | 100 |
| Di-2-ethylhexylphthalate | 130 |
| Barium cadmium stabilizer (Advance BS–105) | 3.5 |
| Celogen (p,p'-oxybis(benzenesulfonyl hydrazide)) | 35 |
| | 285.5 |

11

The sponge is squeezed free of solvent and dried. It is much more stable to ultraviolet light than untreated material.

EXAMPLE 9

The product of Example 3(i) is oxyalkylated by adding 5 moles of ethylene oxide to one mole of product containing 1.5% potassium hydroxide while maintaining the mixture in an autoclave at 80° C. The final product contains 5 oxyethyl groups.

EXAMPLE 10

Example 9 is repeated, using 10 moles of ethylene oxide. The final product contains 10 oxyethyl groups.

EXAMPLE 11

Example 9 is repeated, using 30 moles of ethylene oxide. The final product contains 30 oxyethyl groups.

EXAMPLE 12

Example 9 is repeated, using 100 moles of ethylene oxide. The final product contains 100 oxyethyl groups.

EXAMPLE 13

Example 9 is again repeated, employing 200 moles of ethylene oxide. The final product contains 200 oxyethyl groups.

EXAMPLE 14

The final product of Example 10 is further reacted with 5 moles of propylene oxide to yield a product having 5 terminal oxypropyl groups.

EXAMPLE 15

The product of Example 10 is dispersed in water (2 g./100 g. water) and is used to treat paper, cotton, and gelled regenerated cellulose. Excellent protection against ultraviolet light degradation is obtained.

EXAMPLE 16

The product of Example 11 is employed in formulating liquid detergent as follows:

| | Parts |
|---|---|
| Tetrapotassium pyrophosphate | 25 |
| Nonyl phenol+10 ethylene oxide condensate | 10 |
| Product of Example 11 | 2 |
| Sodium silicate | 3 |
| Carboxy methyl cellulose (low vis.) | 0.5 |
| KOH | 2 |
| Water | 57.5 |

The final formulation shows no degradation when exposed to ultraviolet light for 100 hours.

EXAMPLE 17

2 g. of the product of Example 2 is mixed with 100 g. of granular, high molecular weight formaldehyde polymer (Delrin). Excellent stabilization of the polymer is obtained.

EXAMPLE 18

Examples 1 and 3 are repeated, employing the following α-cyanoamides:

(a) α-cyano-N,N-dimethylacetamide
(b) α-cyano-N,N-diethylacetamide
(c) α-cyano-N,N-diallylacetamide
(d) α-cyano-N,N-bis(β-chloroethyl) acetamide
(e) α-cyano-N,N-bis(β-hydroxyethyl) acetamide
(f) α-cyano-N,N-bis(β-hydroxyethyl) acetamide
(g) α-cyano-N,N-bis(β-ethoxyethyl) acetamide
(h) α-cyano-acetmorpholide
(i) N-cyanoacetylpyrrole
(j) N-cyanoacetyl pyrrolidone
(k) N-cyanoacetyl imidazole
(l) α-cyano-N-methyl-N-ethyl acetamide
(m) α-cyano-N-methyl-N-hydroxyethyl acetamide
(n) α-cyano-N-ethyl-N-cyanoethyl acetamide

EXAMPLE 19

Examples 4, 6, 7, and 8 are repeated, employing the compounds of Example 18. Excellent results are obtained.

EXAMPLE 20

Examples 1, 2, and 3 are repeated, using the following di-functional methylene compounds:

(a) bis-cyanoacetyl ethylene diamide
(b) bis-cyanoacetyl p-phenylene diamide
(c) bis-cyanoacetyl p-cyclohexylene diamide
(d) bis-cyanoacetyl-1,4-butylene diamide
(e) bis-cyanoacetyl-3,5-dichloro-p-phenylene diamide
(f) bis-cyanoacetyl-3,5-bis-methylsulphonyl-p-phenylene diamide
(g) bis-cyanoacetyl-2,2,3,3-tetrachloro-1,4-butylene diamide
(h) bis-cyanoacetyl-N,N'-diethyl ethylene diamide

EXAMPLE 21

Examples 4 and 6 are repeated, employing the bis compounds of Example 20. Excellent results are obtained.

EXAMPLE 22

A 10 g. swatch of "Dacron" (ethylene glycol-terephthalate polyester) cloth is heated in an aqueous bath containing 0.4 g. of the compound of Example 1 dispersed in 250 mls. of water at 190° F. for one hour. The dried cloth is compared with an untreated sample after both are exposed to ultraviolet light in a fadeometer. After 80 hours, the untreated sample shows a distinct yellow coloration, whereas the treated cloth is unchanged.

EXAMPLE 23

Example 22 is repeated, using the compounds of Examples 2, 3, and 18. Similar outstanding results are obtained.

EXAMPLE 24

Examples 22 and 23 are again repeated, using acrylic textile cloths wherein the fibers are composed of:
(a) homopolyacrylonitrile
(b) 90% acrylonitrile-10% vinyl pyridine
(c) A mixture of 95% polyacrylonitrile-5% polyvinyl pyrrolidone

EXAMPLE 25

To 100 g. of powdered nylon 66 (polyhexamethyleneadipamide) are added 1 g. of the absorber of Example 1. After thorough mixing, the composition is extruded into fibers with a hot melt. A cloth is woven from these fibers and compared with a similar fabric without absorber by exposure to ultraviolet light in a fadeometer for 100 hours. The fabric with the absorber shows far superior stability.

EXAMPLE 26

Example 25 is repeated, employing fabric woven from fibers of the following polymers:
(a) "Dacron"
(b) polyethylene
(c) polypropylene
(d) cellulose acetate (2.5 acetyl value)
(e) polyvinylidene chloride

EXAMPLE 27

Examples 25 and 26 are repeated using the compounds of Examples 2, 3(a), 3(d), 3(f), 3(g), 3(i), 18(a), 18(c), 18(h), and 18(n). In all instances, excellent stability is achieved.

The compounds of this invention are soluble in many diverse types of polymers, resins, waxes and the like, and therefore they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are, in general, less soluble in the non-polar solvents but are readily dispersible in water. The compounds containing larger amounts of alkylene oxide, i.e., above about 6 moles thereof per mole of base compound, range from soluble in water to very soluble, the solubility increasing as the number of oxyethylene groups increases.

The ultraviolet absorbing compounds of the present invention may be used to stabilize all organic materials which are susceptible to ultraviolet light degradation, and are particularly useful in the stabilization of resins and plastics, whether they be in the form of films, or molded products, and whether clear, opaque, semi-opaque, or translucent. Plastic foams, fibers and the like are also admirably protected. Pigments polishes, cream, lotions, pharmaceutical and cosmetic compositions, paints, enamels, varnishes, dyestuffs, wood, leather, silk, tobacco products, and the like, may likewise be protected against the degradative effects of actinic radiations. The amount of stabilizer to be incorporated into such compositions is not critical except that a sufficient amount should be employed to effect an acceptable degree of stabilization, and obviously no more need or should be used than necessary to obtain such results. In general, between about 0.1% and 10% by weight of absorber based upon the weight of organic material to be protected, gives admirable stabilization.

Other variations in and modifications of the described compositions and processes, which will be obvious to those skilled in the art, can be made in this invention without departing from the scope or spirit thereof.

We claim:

1. An essentially colorless compound capable of absorbing ultraviolet light within the region of 250–400 millimicrons of the formula:

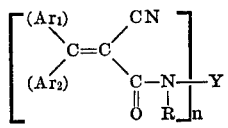

wherein:
(a) ($Ar_1$) represents a mono-heterecyclic nucleus containing at least one pair of conjugated double bonds selected from the group consisting of 5- and 6-membered rings consisting of carbon atoms and 1–3 hetero atoms, wherein the hetero atoms are selected from the group consisting of oxygen, nitrogen and sulfur and the fused benzo derivatives of the said 5- and 6-membered rings.
(b) ($Ar_2$) represents an aromatic, carbocyclic nucleus of up to 14 carbon atoms;
(c) $n$ is an integer from 1 to 2,
(d) R is a substituent selected from the group consisting of hydrogen, alkyl of up to 30 carbon atoms and aryl of 1–3 carbocyclic rings;
(e) Y is R when $n=1$; and
(f) Y is a bivalent radical when $n=2$, said bivalent radical being selected from the group consisting of alkylene of 2–10 carbon atoms, cyclohexylene, phenylene, and naphthylene; with the proviso that when $n$ is 1, R and Y may together form the atoms necessary to form a hetero ring with the amido nitrogen selected from morpholino, pyrrolyl, pyrrolidonyl and imidazolyl.

2. A compound as defined in claim 1 wherein $Ar_1$ and $Ar_2$ are monocyclic.
3. A compound as defined in claim 1 wherein $Ar_1$ is monocyclic and $Ar_2$ is bicyclic.
4. A compound as defined in claim 1 wherein $Ar_1$ is benzohetero and $Ar_2$ is monocyclic.
5. A compound as defined in claim 1 wherein $Ar_1$ is benzohetero and $Ar_2$ is bicyclic.
6. A compound as defined in claim 1 wherein $Ar_1$ is a sulphur heterocyclic.
7. A compound as defined in claim 1 wherein $Ar_1$ is a nitrogen heterocyclic.
8. A compound as defined in claim 1 wherein $Ar_1$ is an oxygen heterocyclic.
9. A compound as defined in claim 2 wherein $Ar_1$ is thienyl and $Ar_2$ is phenyl.
10. A compound as defined in claim 2 wherein $Ar_1$ is furyl and $Ar_2$ is phenyl.
11. A compound as defined in claim 3 wherein $Ar_1$ is thienyl and $Ar_2$ is naphthyl.
12. A compound as defined in claim 1 wherein $n=1$
13. A compound as defined in claim 1 wherein $n=2$.
14. A compound as defined in claim 12 wherein R and Y are hydrogen.
15. A compound as defined in claim 12 wherein R and Y are alkyl.
16. A compound as defined in claim 13 wherein R is hydrogen and Y is alkylene.
17. α-cyano-β-phenyl-β-(2-thienyl) acrylamide.
18. α - cyano - β-(3,4-dimethoxyphenyl)-β-(2-furyl)-acrylamide.
19. Ethylene bis-(α-cyano-β-phenyl-β-thienyl) acrylamide.

References Cited

UNITED STATES PATENTS 3,523,953  8/1970  Strobel et al. _____ 260—332.2

HENRY R. JILES, Primary Examiner

C. M. SHURKO, Assistant Examiner

U.S. Cl X.R.

8—115.6, 128R; 106—176; 117—142, 148; 252—135, 300, 401; 260—2.5P, 13, 67FP, 248CS, 249, 250A, 250R, 251R, 251Q